United States Patent [19]
Kim et al.

[11] Patent Number: 5,866,492
[45] Date of Patent: Feb. 2, 1999

[54] LOW-TEMPERATURE SINTERABLE TEMPERATURE COMPENSATING MICROWAVE DIELECTRIC CERAMIC COMPOSITION

[75] Inventors: Hyo Tae Kim; Yoon Ho Kim, both of Seoul; Young Ho Roh, Daejeon, all of Rep. of Korea

[73] Assignee: Korea Institute of Science and Technology, Seoul, Rep. of Korea

[21] Appl. No.: 775,744

[22] Filed: Dec. 31, 1996

[30] Foreign Application Priority Data

Sep. 11, 1996 [KR] Rep. of Korea .................. 1996 39239

[51] Int. Cl.$^6$ .................................................. C04B 35/460

[52] U.S. Cl. ........................................... 501/134; 501/136

[58] Field of Search ...................................... 501/134, 136

[56] References Cited

U.S. PATENT DOCUMENTS

| | | | |
|---|---|---|---|
| 4,468,432 | 8/1984 | Matsukura et al. | 428/328 |
| 4,582,814 | 4/1986 | Thomas | 501/136 |
| 5,294,577 | 3/1994 | Yamamoto et al. | 501/134 |

FOREIGN PATENT DOCUMENTS

| | | |
|---|---|---|
| 73-018026 B | 3/1968 | Japan . |
| 73-018029 B | 4/1968 | Japan . |

*Primary Examiner*—Deborah Jones
*Attorney, Agent, or Firm*—McDermott, Will & Emery

[57] ABSTRACT

A low-temperature sintering temperature compensating microwave dielectric ceramic composition includes $ZnTiO_3$ stoichiometrically combined with ZnO and $TiO_3$, wherein $Zn^{2+}$ of the $ZnTiO_3$ is replaced with $Mg^{2+}$ to produce $(Zn_{1-x}Mg_x)TiO_3$ (X=0.02~0.5). The composite has a fine structure and improved dielectric property without a sintering agent.

3 Claims, No Drawings

LOW-TEMPERATURE SINTERABLE TEMPERATURE COMPENSATING MICROWAVE DIELECTRIC CERAMIC COMPOSITION

BACKGROUND OF THE INVENTION

1. Field of the Invention

The present invention relates to a thermal compensating microwave dielectric ceramic composition, and more particularly a low-temperature sintering temperature compensating microwave dielectric ceramic composition which makes it possible to sinter at a low temperature ranging from 1050° C. to 1250° C., consisting of a composition of $ZnTiO_3$ stoichiometrically combined with ZnO and $TiO_2$ and $(Zn_{1-x}Mg_x)TiO_3$ in which some of the ZnO of the $ZnTiO_3$ is replaced with MgO.

2. Description of the Prior Art

Recently, communication equipments such as wireless telephone receivers and mobile phones, and electronic parts applied to transmitter/receivers for satellite communication are increasingly getting higher in frequency, smaller in size and lighter in weight. Accordingly, high frequency is being evolved from a conventional bulk type to a multilayer type which enables a surface mounting, and also to a composite module.

In electrical circuits, a ceramic dielectric is applied to a variety of objectives such as by-passing, coupling and filtering. Thermal compensating ceramic dielectric is mainly used to manufacture high frequency devices such as coupling circuits, filters and resonators.

Significant electrical properties applicable to the above objectives may include a high dielectric constant, a low dielectric loss, a high quality (Q) factor, a temperature coefficient of capacitance and/or resonant frequency, a high insulating resistance, a high mechanical strength, and a low thermal expansion coefficient.

What is more important in applying to a practical use properties such as timing and tuning respectively appropriate to a high frequency equipment may be a quality coefficient, a capacitance, and the stability of a resonant frequency. Further, in a tuning circuit, the resonant frequency requires a correspondence to or a compensation for environmental factors such as temperature, humidity, voltage and electric current.

A precise sintering having mechanical strength and dielectric property sufficient for serving as a device without an additional sintering agent is not obtained at a high sintering temperature ranging from 1300° C. to 1600° C. as shown in conventional high frequency dielectric compositions such as barium titanites: $BaTi_4O_9$, $Ba_2Ti_4O_{20}$ and $Ba_2Ti_5O_{11}$, magnesium titanites:$(Mg,Ca)TiO_3$, ZST:$(Zn,Sn)TiO_4$, barium perovskites: $Ba(Zn_{1/3}Nb_{2/3})O_3$, $Ba(Zn_{1/3}Nb_{2/3})O_3$, $Ba(Mg_{1/3}Nb_{2/3})O_3$ and $Ba(Mg_{1/3}Ta_{2/3})O_3$, $(Ca,Sr,Ba)ZrO_3$, and $(Ca,Sr)[(Li,Nb)Ti]O_3$.

SUMMARY OF THE INVENTION

Therefore, it is an object of the present invention to provide a temperature compensating microwave dielectric ceramic composition which can be sintered at a relatively low temperature ranging from 1050° C. to 1250° C., while having a fine structure, an improved dielectric property without a sintering agent, a wide range of temperature compensation, and a three-component composite consisting of a relatively cheap metal oxide material.

To achieve the above-described object, the present invention provides a temperature compensating microwave dielectric ceramic composition capable of low-temperature sintering $ZnTiO_3$ combined stoichiometrically with $ZnO_x$ and $TiO_x$.

Further, the present invention provides a temperature compensating microwave dielectric ceramic composition which makes it possible to perform a low temperature sintering, wherein $Mg^{2+}$ is substituted for $Zn^{2+}$ in $ZnTiO_3$ so as to produce $(Zn_{1-x}Mg_x)TiO_3$ (here, X=0.02~0.5, and preferably X=0.20~0.35).

DETAILED DESCRIPTION OF THE PRESENT INVENTION

The fabrication method of the present invention composed basically of $ZnTiO_3$ which stoichiometrically consists of ZnO and $TiO_2$ will now be described.

As a starting material, a powder sample of ZnO and $TiO_2$ respectively having 99.9% purity is weighed, wet-ground by using deionized water, dried, filtered, the dry powder is mixed with a PVA binder solution, and formed by a mechanical pressing, thereby fabricating a disk sample, which is in turn baked in a normal atmosphere at a temperature of 1100° C.~1300° C.

Meanwhile, to obtain a temperature coefficient of capacitance and/or resonant frequency approximating 0 ppm/°C., some of the Zn in the composite $ZnTiO_3$ is replaced with Mg so as to produce an improved property of $(Zn_{1-x}Mg_x)TiO_3$.

That is, the temperature coefficient of capacitance and/or resonant frequency of $ZnTiO_3$ is approximately +325 ppm/°C. so that $MgTiO_3$, having a negative temperature coefficient and a high quality microwave dielectric property, is adopted as an appropriate compensating dielectric for thereby providing a required temperature coefficient of 0 ppm/°C. Therefore, when Zn of $ZnTiO_3$ and Mg of $MgTiO_3$ are combined in an appropriate ratio, a temperature compensating microwave dielectric ceramic composition having from a positive temperature coefficient to a 0 ppm/°C. and to a positive temperature coefficient at a nearby one thereto are respectively obtained according to the present invention.

The dielectric ceramic is manufactured by adding thereto MgO ranging from 0.02 mol to 0.5 mol, and preferably 0.2 to 0.35 mol so as to substitute $Mg^{2+}$ for $Zn^{2+}$ in the stoichiometric $ZnTiO_3$, wherein the experimental composition includes $(Zn_{1-x}Mg_x)TiO_3$ (X=0.02~0.5).

The above composition can be sintered at a low temperature relative to the conventional ones.

With reference to the accompanying examples, the present invention will now be detailed; however the scope is not confined to the examples.

EXAMPLE 1

As a starting material for fabricating $ZnTiO_3$, 1 mole of a reagent ZnO powder with 99.9% in purity and 1 mole of a $TiO_2$ powder were respectively weighed and wet-ground using deionized water and a zirconium ball mill for 24 hours. The dried powder was mixed with 2 wt % of PVA binder solution, filtered by a sieve of 100 mesh, and pressed under a pressure of 98 MPa for thereby forming disk pellets. The formed pellets were respectively sintered at a temperature of 1100° C.~1300° C. for two hours and at a heating rate of 300° C./hour under a normal atmosphere.

To measure the dielectric property of the thusly fabricated ceramic dielectric resonators in a microwave region, a network analyzer HP-8720C was employed, and the dielectric constant was measured by a Hakki-Coleman dielectric rod resonator, thereby resulting in a resonating frequency value in a $TE_{011}$ resonant mode. The quality factors and temperature coefficients were measured in a transmission open cavity.

In accordance with such microwave dielectric property measurements, the dielectric constant, quality factor and temperature coefficient of each sample according to the respective sintering temperature are shown in Table 1.

TABLE 1

Microwave dielectric properties of $ZnTiO_3$

| Sintering Tem. (°C.) | Dielectric Cons. ($\epsilon_r$) | Quality Coef. (Q) | Resonating Freq. (GHz) | T.Coef. ($\tau_f$:ppm/°C.) |
|---|---|---|---|---|
| 1100 | 100 | 5410 | 5.17 | 325 |
| 1200 | 99 | 4050 | 5.17 | |
| 1300 | 97 | 5020 | 5.23 | |

EXAMPLE 2

MgO was added to $ZnTiO_3$ serving as a basic composition, in the amount of 0.02 mol~0.5 mol so as to substitute $Mg^{2+}$ for $Zn^{2+}$, thereby producing a dielectric composite having the experimental composition of $(Zn_{1-x}Mg_x)TiO_3$ (X=0.02–0.5), and the composition was calcined at a temperature of 900° C. for two hours, and sintered at 1050° C.~1250° C. for 4 and 16 hours. The other experimental conditions were identical to those in

EXAMPLE 1.

Tables 2 and 3 are provided to show examples of the present invention, wherein the amount of MgO serving as a substitution element ranged from 0.02 mol to 0.5 mol, and sintering temperature ranged from 1050° C. to 1250° C., which experiments were respectively performed for 4 and 16 hours.

TABLE 2

Microwave dielectric properties of $(Zn_{1-x}Mg_x)TiO_3$ (4-hour sintering)

| X (mol) | Sinter Tem. (°C.) | Di.Con. ($\epsilon_r$) | Quality Coef. (Q) | Re.Freq. (GHz) | T.Cf. ($\tau_f$:ppm/°C.) |
|---|---|---|---|---|---|
| 0.02 | 1100 | 29.06 | 2060 | 9.2895 | 36 |
|  | 1150 | 29.24 | 2330 | 9.2706 | 45 |
|  | 1200 | 29.31 | 1970 | 9.2163 | 39 |
|  | 1250 | 29.48 | 3380 | 9.2163 | 39 |
| 0.04 | 1100 | 27.74 | 2120 | 9.3524 | 45 |
|  | 1150 | 28.4 | 2430 | 9.3285 | 38 |
|  | 1200 | 29.39 | 1920 | 9.2759 | 33 |
|  | 1250 | 28.97 | 3120 | 9.2854 | 40 |
| 0.08 | 1100 | 28.75 | 2370 | 9.3082 | 48 |
|  | 1150 | 29.94 | 2430 | 9.2895 | 32 |
|  | 1200 | 29.48 | 2030 | 9.2609 | 43 |
|  | 1250 | 29.04 | 3360 | 9.3825 | 58 |

TABLE 2-continued

Microwave dielectric properties of $(Zn_{1-x}Mg_x)TiO_3$ (4-hour sintering)

| X (mol) | Sinter Tem. (°C.) | Di.Con. ($\epsilon_r$) | Quality Coef. (Q) | Re.Freq. (GHz) | T.Cf. ($\tau_f$:ppm/°C.) |
|---|---|---|---|---|---|
| 0.15 | 1100 | 24.94 | 4000 | 9.8076 | 14 |
|  | 1150 | 28.54 | 2340 | 9.3139 | 48 |
|  | 1200 | 29.28 | 2090 | 9.2588 | 50 |
|  | 1250 | 21.26 | 4180 | 10.395 | 48 |
| 0.3 | 1100 | 21.67 | 8850 | 10.2209 | 65 |
|  | 1150 | 22.05 | 9750 | 10.2279 | 65 |
|  | 1200 | 19.73 | 3450 | 10.304 | 66 |
|  | 1250 | 20.16 | 5110 | 10.3797 | 55 |
| 0.5 | 1100 | 20.5 | 6320 | 10.3082 | 65 |
|  | 1150 | 20.77 | 5660 | 10.2997 | 66 |
|  | 1200 | 20.92 | 7360 | 10.2867 | 67 |
|  | 1250 | 20.31 | 6730 | 10.4515 | 73 |

TABLE 3

Microwave dielectric properties of $(Zn_{1-x}Mg_x)TiO_3$ (16-hour sintering)

| X (mol) | Sinter Tem. (°C.) | Di.Con. ($\epsilon_r$) | Quality Coef. (Q) | Re.Freq. (GHz) | T.Cf. ($\tau_f$:ppm/°C.) |
|---|---|---|---|---|---|
| 0.02 | 1050 | 29.21 | 2350 | 9.4153 | 40 |
|  | 1100 | 35.43 | 1920 | 903832 | 33 |
|  | 1150 | 36.34 | 2440 | 9.3734 | 88 |
|  | 1200 | 36.03 | 2340 | 9.3761 | 36 |
|  | 1250 | 35.93 | 2040 | 9.3924 | 27 |
| 0.04 | 1050 | 28.03 | 2000 | 9.4568 | 39 |
|  | 1100 | 28.13 | 2310 | 9.4056 | 45 |
|  | 1150 | 28.77 | 2460 | 9.3496 | 42 |
|  | 1200 | 29.14 | 2350 | 9.2903 | 48 |
|  | 1250 | 28.67 | 1890 | 9.3379 | 40 |
| 0.08 | 1050 | 29.67 | 2210 | 9.418 | 47 |
|  | 1100 | 28.71 | 2480 | 9.3739 | 46 |
|  | 1150 | 29.18 | 2740 | 9.3805 | 43 |
|  | 1200 | 29.18 | 2560 | 9.3408 | 44 |
|  | 1250 | 29.07 | 2240 | 9.348 | 60 |
| 0.15 | 1050 | 21.15 | 4430 | 10.416 | 29 |
|  | 1100 | 26.07 | 3420 | 9.7231 | 1 |
|  | 1150 | 29.34 | 2350 | 9.3099 | 42 |
|  | 1200 | 28.69 | 2900 | 9.3577 | 52 |
|  | 1250 | 21.36 | 2920 | 12.3955 | 57 |
| 0.3 | 1050 | 25.26 | 4110 | 10.0153 | 32 |
|  | 1100 | 21.87 | 8150 | 10.3288 | 70 |
|  | 1150 | 22.45 | 9390 | 10.2465 | 63 |
|  | 1200 | 19.8 | 3960 | 10.424 | 59 |
|  | 1250 | 21.23 | 1440 | 12.3931 | 56 |
| 0.5 | 1050 | 22.3 | 2470 | 10.2898 | 72 |
|  | 1100 | 21.6 | 2620 | 10.4334 | 60 |
|  | 1150 | 2197 | 6860 | 10.3986 | 67 |
|  | 1200 | 20.8 | 8580 | 10.3339 | 70 |
|  | 1250 | 19.55 | 610 | 10.4405 | 63 |

In Example 1 according to the present invention, there was obtained a dielectric ceramic composition basically consisting of $ZnTiO_3$ formed by mixing 1 mole of ZnO with 1 mole of $TiO_2$. Of main dielectric properties, the dielectric constant ranged from 97 to 100, the quality factor ranged from 4050 to 5410 (5.2 GHz), and the temperature coefficient of resonant frequency was approximately +325 ppm/°C.

In Example 2, the dielectric ceramic composition having $(Zn_{1-x}Mg_x)TiO_3$ in which some of the Zn of $ZnTiO_3$ was replaced with Mg while having $ZnTiO_3$ as a basic composition, enabled in a lower sintering temperature ranging from 1050° to 1250° C. to provide an improved low-temperature sintering temperature compensating microwave dielectric ceramic composition when compared to the dielectric ceramic composition of Example 1, wherein the dielectric constant ranged from 20 to 50, the quality factor ranged from 2000 to 9700 (9–10 GHz), Q*f ranged from 20,000 to 100,000, and the temperature coefficient of resonant frequency ranged from −73 to +88 ppm/°C.

What is claimed is:

1. A low-temperature sintering temperature compensating microwave $ZnTiO_3$-based dielectric ceramic composition sinterable at a low temperature in the range of about 1050° C. to about 1250° C., comprising $ZnTiO_3$ containing ZnO and $TiO_2$ in stoichiometric amounts.

2. The composition according to claim 1, wherein $Zn^{2+}$ of the $ZnTiO_3$ is replaced with $Mg^{2+}$ to produce $(Zn_{1-X}Mg_X)TiO_3$ wherein, X=0.02–0.5.

3. The composition according to claim 2, wherein X ranges from 0.20 to 0.35.

* * * * *